(12) United States Patent
Zogg et al.

(10) Patent No.: US 7,830,781 B2
(45) Date of Patent: Nov. 9, 2010

(54) WAVEFORM FOR VIRTUALLY SIMULTANEOUS TRANSMISSION AND MULTIPLE RECEPTIONS SYSTEM AND METHOD

(75) Inventors: Scott J. Zogg, Cedar Rapids, IA (US); Stephen M. Clark, Marion, IA (US); Richard S. Haendel, Iowa City, IA (US); Ronald R. Meyer, Cedar Rapids, IA (US); Brian L. Aanderud, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2019 days.

(21) Appl. No.: 10/217,731

(22) Filed: Aug. 13, 2002

(65) Prior Publication Data

US 2004/0032878 A1    Feb. 19, 2004

(51) Int. Cl.
  *H04J 11/00* (2006.01)
  *H04L 12/413* (2006.01)
  *H04B 1/00* (2006.01)
(52) U.S. Cl. .................. 370/208; 370/445; 375/135; 375/136
(58) Field of Classification Search ................. 370/454
See application file for complete search history.

(56) References Cited

U.S. PATENT DOCUMENTS

| | | | |
|---|---|---|---|
| 4,231,113 A * | 10/1980 | Blasbalg ................... 380/34 |
| 4,383,323 A | 5/1983 | Timor |
| 4,688,251 A | 8/1987 | Citron et al. |
| 5,025,452 A * | 6/1991 | Sohner et al. ............... 375/130 |
| 5,422,952 A | 6/1995 | Kennedy et al. |
| 5,625,641 A | 4/1997 | Takakusaki |
| 5,715,236 A * | 2/1998 | Gilhousen et al. ........... 370/209 |
| 5,757,767 A * | 5/1998 | Zehavi ...................... 370/208 |
| 5,781,582 A | 7/1998 | Sage et al. |
| 5,832,026 A | 11/1998 | Li |
| 5,914,933 A * | 6/1999 | Cimini et al. ............... 370/208 |
| 5,930,244 A * | 7/1999 | Ariyoshi et al. ............ 370/335 |
| 5,943,361 A * | 8/1999 | Gilhousen et al. ........... 375/142 |
| 6,049,535 A * | 4/2000 | Ozukturk et al. ............ 370/335 |
| 6,088,337 A * | 7/2000 | Eastmond et al. ........... 370/280 |
| 6,169,761 B1 | 1/2001 | Marcoccia et al. |
| 6,246,698 B1 * | 6/2001 | Kumar ....................... 370/487 |
| 6,320,896 B1 | 11/2001 | Jovanovich et al. |
| 6,498,820 B1 | 12/2002 | Thomson et al. |
| 6,519,262 B1 * | 2/2003 | Stephens et al. ............ 370/442 |
| 6,522,650 B1 | 2/2003 | Yonge et al. |
| 6,658,063 B1 | 12/2003 | Mizoguchi et al. |
| 6,671,331 B1 | 12/2003 | Sakuma |

(Continued)

*Primary Examiner*—Melanie Jagannathan
(74) *Attorney, Agent, or Firm*—Matthew J. Evans; Daniel M. Barbieri

(57) ABSTRACT

A radio is disclosed. The radio system includes radio system nodes that are configured with a transceiver to transmit and receive information over more than one frequency. Each radio system node also includes a processor, the processor being any of a variety of processing elements, including but not limited to general purpose processors, coders, decoders, and the like. The processor is configured to gather a block of information and configured to format the block of information into a plurality of sub blocks. Each sub block of information includes message synchronization information. The sub blocks are dispersed in time and over the more than one frequency and substantially simultaneous transmission and reception of multiple transmissions in the same frequency band is enabled.

24 Claims, 5 Drawing Sheets

U.S. PATENT DOCUMENTS

| | | |
|---|---|---|
| 6,686,829 B1 * | 2/2004 | Hohberger et al. ......... 340/10.1 |
| 6,721,331 B1 | 4/2004 | Agrawal et al. |
| 6,836,469 B1 | 12/2004 | Wu |
| 6,904,282 B2 * | 6/2005 | Cooper ....................... 455/434 |
| 6,917,606 B2 | 7/2005 | Sashihara |
| 7,088,734 B2 * | 8/2006 | Newberg et al. ............ 370/437 |
| 7,142,521 B2 * | 11/2006 | Haugli et al. ............... 370/320 |
| 7,292,617 B2 | 11/2007 | Beasley et al. |
| 2002/0009067 A1 | 1/2002 | Sachs et al. |
| 2003/0012217 A1 | 1/2003 | Andersson et al. |
| 2003/0053469 A1 | 3/2003 | Wentink |

* cited by examiner

WAVEFORM FOR VIRTUALLY SIMULTANEOUS TRANSMISSION AND MULTIPLE RECEPTIONS SYSTEM AND METHOD

STATEMENT REGARDING FEDERALLY SPONSORED RESEARCH OR DEVELOPMENT

The invention was made with U.S. Government support under contract no. F33615-01-C-1856 awarded by the Defense Advanced Research Projects Agency (DARPA) and the U.S. Government has certain rights in this invention.

BACKGROUND

The invention relates to data communications via radio. More specifically, the invention relates to solving the problem of a number of users virtually simultaneously transmitting information with short delay to a receiver.

A conventionally known method of providing for multiple users includes the Aloha radio protocol. In the Aloha system, the user is equipped with a transmitter and receiver for the same radio channel. The user simply transmits the information on a radio channel without warning or preparation. All other users listen to the channel all of the time. The capacity of the channel is sized to insure that the channel is lightly loaded. Accordingly, the channel is normally idle, and when a user wishes to use the channel the user will normally encounter an idle channel. If two users overlap on the channel, they suffer a "collision" and the messages from both users are normally lost. Messages incorporate a reliable error detecting code. Messages corrupted by collisions are detected and thrown away by all recipients.

Conventional Aloha protocols may be designed with various features. For example, the protocol may (will normally) include an acknowledgement by the recipient. If no acknowledgement is received, the user will retransmit. Retransmission will occur after a random delay.

In certain situations, an event occurs which would make two or more users try to use the channel at the same time. In such instances, the exact time of transmission access is normally randomized by each user to help avoid collisions.

In another conventional radio system protocol, the user may listen before transmitting to help avoid collisions (known as carrier sensing). When another user's carrier goes away, multiple users might wish to transmit at exactly the same time as soon as a sensed carrier goes away. To avoid the correlated event, users impose on themselves individually randomized time delay after cessation of the sensed carrier. This technique may not work perfectly in real systems. For example, User A may be transmitting. User B may wish to transmit, but may not be able to hear user A—perhaps because they are over the horizon from one another—so User B thinks the channel is clear and transmits. When this happens, a collision may occur at the recipient, user C, positioned between user A and B and able to hear both.

In yet another conventional radio system protocol, the system may be "slotted." In a typical Aloha system, in which the users transmit entirely without coordination, if a new user collides with just the last small portion of an ongoing transmission, then both messages are lost. Slotted Aloha systems avoid this problem by forcing all transmission into a transmission slot predefined in time. Therefore, there are no partial collisions, and the channel capacity is effectively doubled. For example, if it is desired to achieve 99 percent first time success in an unslotted Aloha system the channel must be kept below ½ of one percent. In a slotted Aloha system, 99 percent first time success may be achieved in a system loaded to 1 percent. Moreover, if in an Aloha system one wishes to transmit all the information in 1 percent of the channel capacity, then very large bandwidths and very high power may be required.

Accordingly, there is a need for a radio system in which simultaneous transmission and reception of multiple transmissions in the same frequency band is enabled. Further, there is a need for a radio system in which simultaneous transmission and reception of multiple transmissions in the same frequency band is enabled and the amount of traffic that is successfully sent and received over the frequency band is improved. Further, there is a need for a radio waveform that breaks down a block of information into a plurality of sub blocks of information and disperses the plurality of sub blocks of information over a discrete time period and over a plurality of frequencies to enable virtually simultaneous transmission and multiple receptions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

One example of the invention relates to a radio system node. The radio system node includes a transceiver configured to transmit and receive information over more than one frequency. The radio system node also includes a processor configured to gather a block of information and configured to format the block of information into a plurality of sub blocks, each sub block comprising message synchronization information. The sub blocks are dispersed in time and over the more than one frequency and substantially simultaneous transmission and reception of multiple transmissions in the same frequency band is enabled.

Another example of the invention relates to a radio waveform. The radio waveform includes a plurality of sub blocks of information. The sub blocks of information are derived from a block of information. Each sub block of information comprises synchronization information and phase reference information. The radio waveform also includes a plurality of frequencies over which the plurality of sub blocks are dispersed. Further, the radio waveform includes a discrete time period over which the plurality of sub blocks are dispersed. Substantially simultaneous transmission and reception of multiple transmissions in the same frequency band is enabled.

Another example of the invention relates to a method of transmitting a block of information. The method includes parsing the block of information into a plurality of sub blocks of information. The method also includes incorporating synchronization information into the sub blocks of information. The method further includes selecting a time period over which the sub blocks will be transmitted. Further still, the method includes transmitting the sub blocks of information. Each of the sub blocks of information are dispersed across the time period and across a range of frequencies.

Yet another example of the invention relates to a radio system node. The radio system node includes a transceiver. The radio system node also includes a waveform means for allowing simultaneous transmission and reception of multiple transmissions in the same frequency band.

Alternative exemplary embodiments and examples of the invention relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
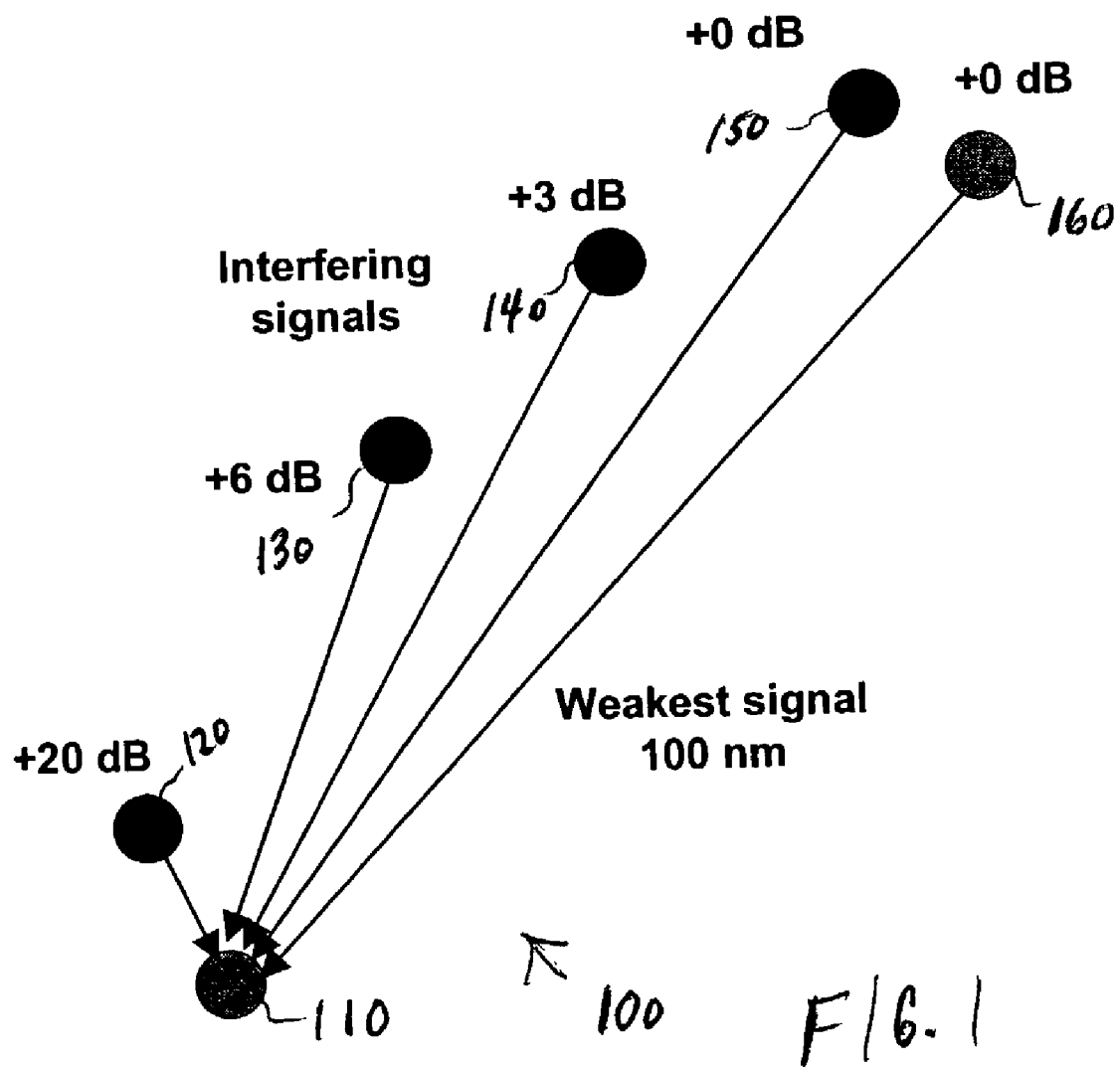
FIG. 1 is an exemplary depiction of a scenario including six transceivers in which five of the transceivers are transmitting.

Improvements over the Aloha radio system may be made by splitting the normal, single burst (single block of information) Aloha transmission into a number of smaller bursts (sub blocks of information). These smaller bursts are spread out over time and frequency. Referring to FIG. 1, an exemplary radio system 100 is depicted including six transceiver devices 110, 120, 130, 140, 150, and 160. In the exemplary depiction, five signals are being received simultaneously by transceiver 110. Signals from transceivers 150 and 160 are being sent from 100 nautical miles (n.m.) to transceiver 110. Signals from transceiver 140 are being sent from 70 n.m., signals from transceiver 130 are being sent from 50 n.m., and signals from transceiver 120 are being sent from 10 n.m. These distances are merely exemplary and are not to be construed as limiting. Transceivers, not limited in number to six, may be located at an infinite variety of locales. In an exemplary configuration, a total network load of 11.25 megabits per second (Mbps) may be achieved, however, other data rates may be achieved based on a variety of changed parameters and hardware. Using the waveform disclosed herein, transceiver 110 is enabled to receive, virtually simultaneously, signals from transceivers 120, 130, 140, 150, and 160.

Figure 2:
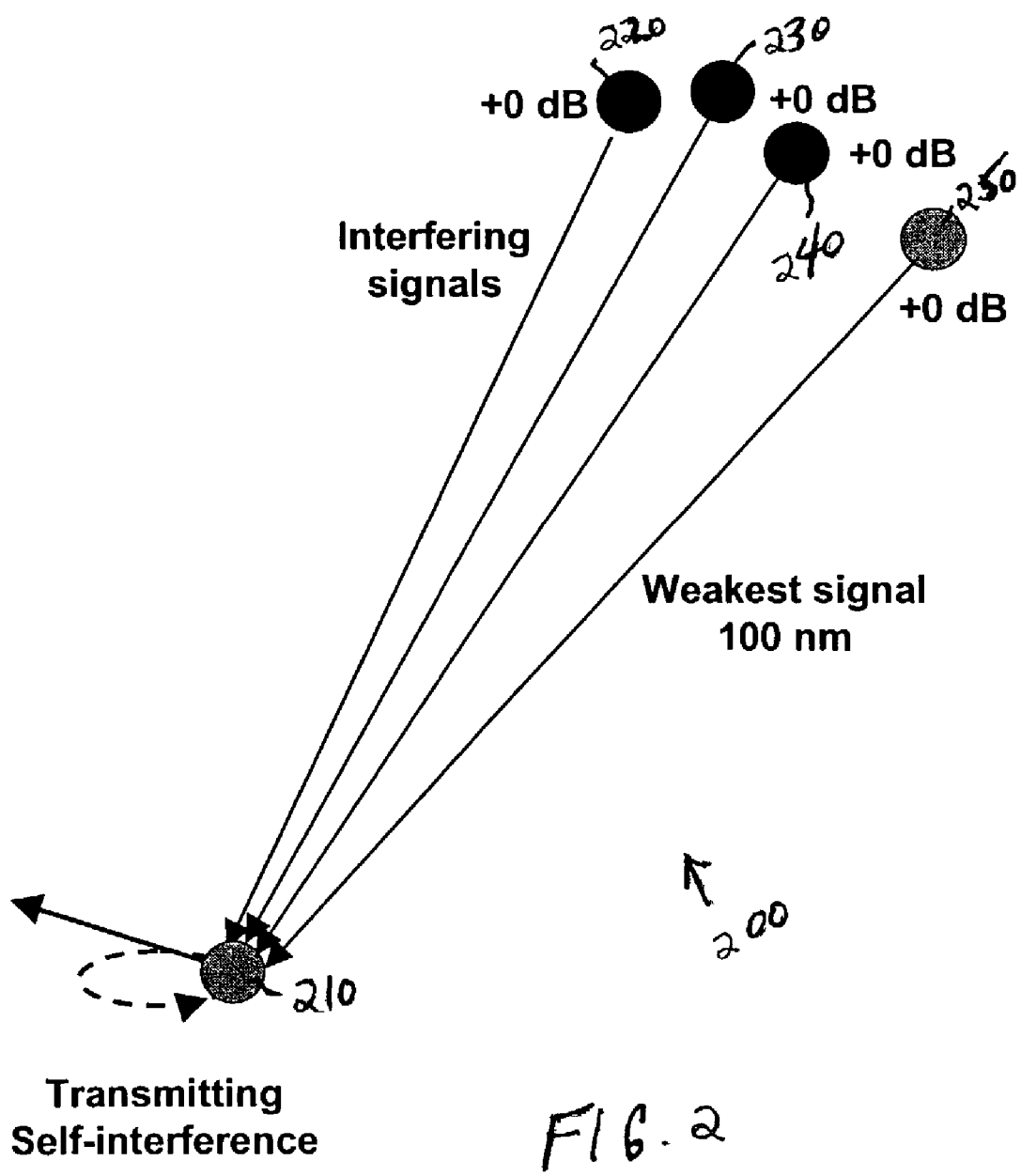
FIG. 2 is an exemplary depiction of a scenario having five transceivers in which five of the transceivers are transmitting.

Similarly, in an exemplary system 200, depicted in FIG. 2, five transceivers 210, 220, 230, 240, and 250 are all transmitting, as well, transceiver 210 is receiving four incoming signals from transceivers 220, 230, 240 and 250. While a user of transceiver 210 is making a single transmission of information, that information is broken up and encoded into, for example, 16 sub-transmissions, which are spread out randomly and/or pseudo-randomly over time and frequency, so that when an overall transmission is being made, the actual percentage of transmitting time is about 30 percent, and these transmissions may be spread over several frequency channels, for example 16 channels. The invention should not, however, be construed to be limited to 16 channels. Any number of channels may be used and, further, any time period over which the sub transmissions or sub blocks of information are sent may be varied depending on design characteristics. However, for the scenario depicted in FIG. 2, in an exemplary embodiment, four signals are received simultaneously while transmitting at full duty cycle all signals being received from approximately 100 n.m. and an 11.25 Mbps network load may be achieved.

Figure 3:
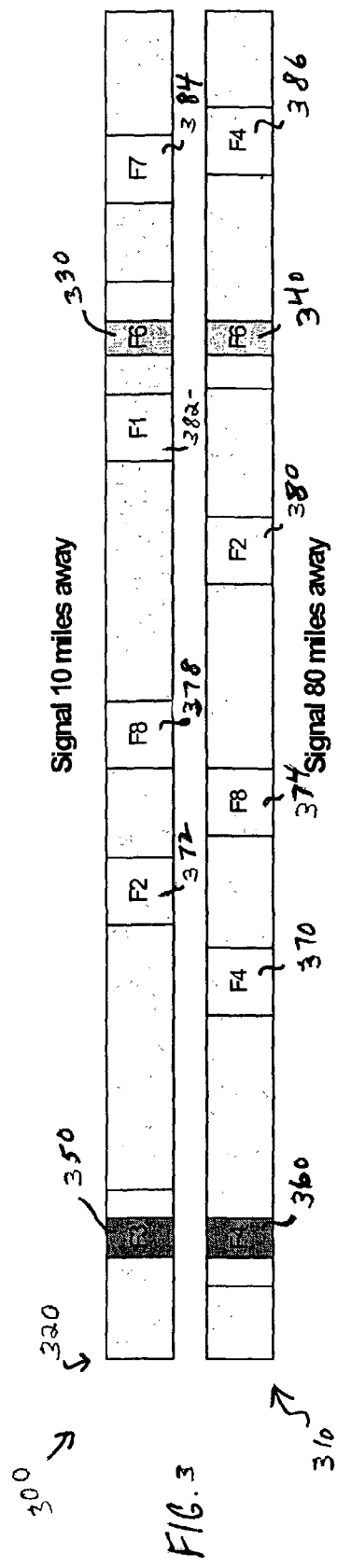
FIG. 3 is an exemplary depiction of a timeline of transmissions being received by a single transceiver.

Referring now to FIG. 3, a timeline 300 is depicted. Timeline 300 is representative of signals being received from a transmitter 80 miles away in timeline 310 and also signals received from a transmitter 10 miles away in timeline 320. In an exemplary embodiment, signals 330 and 340 which are on the same frequency (F6) and overlap in time will interfere and may be lost. Signals 350 and 360 which are on different channels (F3) and (F4), respectively, but are received at the same time may interfere slightly because they are received on adjacent frequencies, however, they may still be properly received. Other signals, for example, 370, 372, 374, 378, 380, 382, 384, and 386 will all be received without interference because they do not overlap in time and/or frequency. Accordingly, it may be seen that by dispersing the block of information or block transmission into sub transmissions and/or sub blocks and dispersing them over time and frequency provides an opportunity for a receiver to receive multiple transmissions while improving upon the number of lost transmissions due to interference, as compared with many conventional systems.

Figure 4:
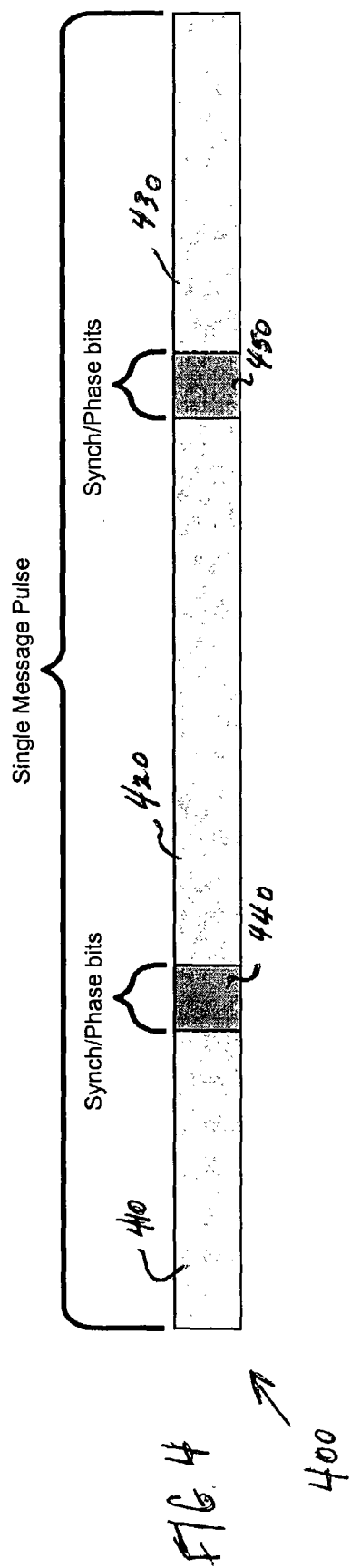
FIG. 4 is an exemplary depiction of a sub block or sub transmission.

Referring now to FIG. 4, a sub transmission 400 is depicted. Each sub transmission includes blocks of information 410, 420, and 430, as well as synchronization and reference phase information 440 and 450 incorporated therein.

Figure 5:
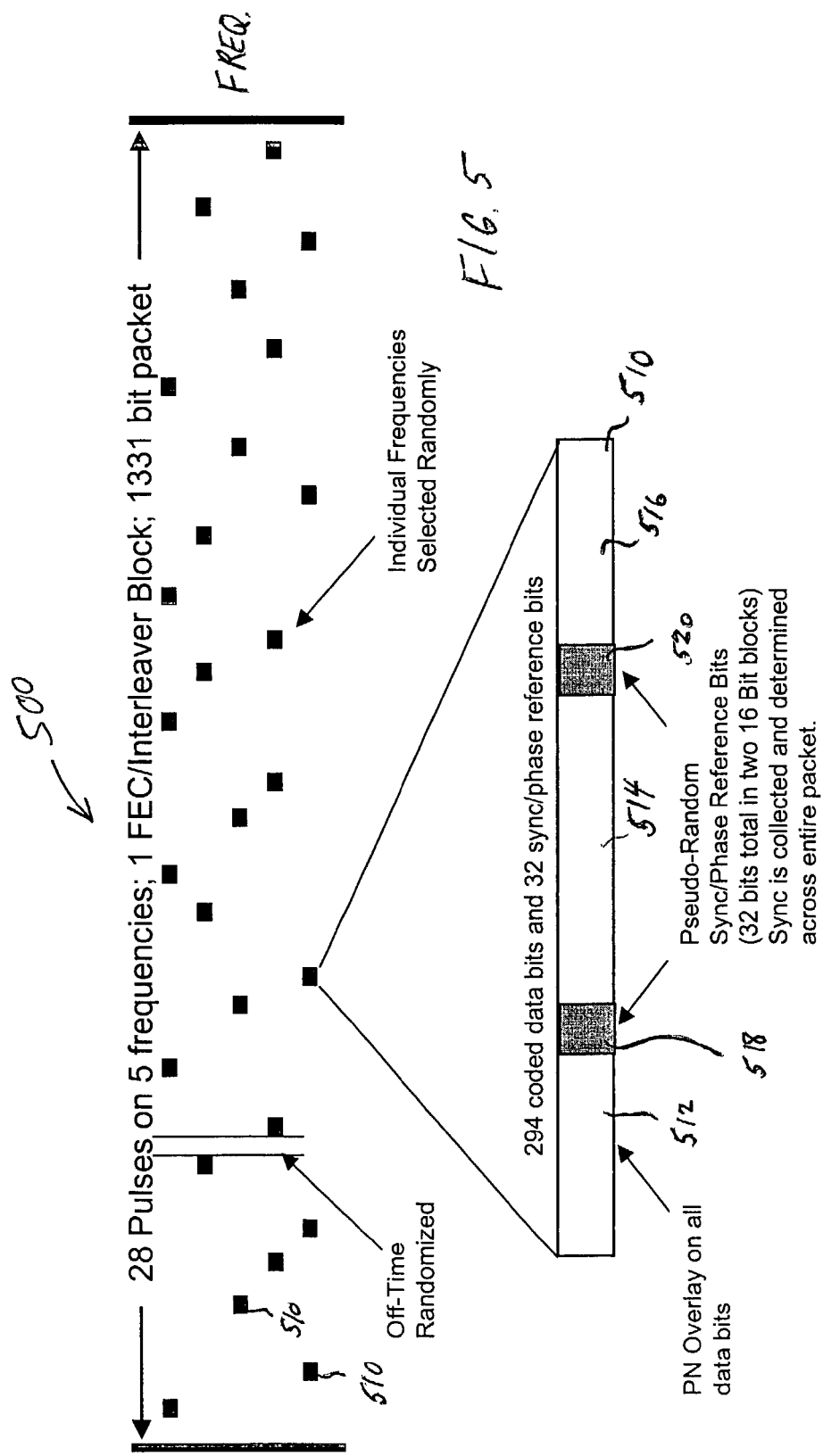
FIG. 5 is an exemplary waveform diagram depicting a larger block of information broken down into sub blocks of information and dispersed in time and frequency.

Referring now to FIG. 5, a waveform 500 is depicted. Waveform 500 is representative of a block of information which is parsed or separated into 28 sub blocks of information represented by squares 510. Each of the sub blocks of information is again made up of information blocks 512, 514, and 516 as well as synchronization and phase reference information 518 and 520. In an exemplary embodiment, each sub block of information includes 294 coded data bits and 32 synch and phase reference bits. In an exemplary embodiment, the synch and phase reference bits 518 and 520 may be distributed at a random location or a pseudo-random location within the sub block 510. The vertical axis of waveform diagram 500 is representative of the five different frequencies on which the exemplary block of information is transmitted. In the example depicted, the larger block of information is a 1331 bit packet requiring 591 microseconds to transmit (2.25 MHz). This provides a 60 MHz symbol rate with 28 pulses or sub blocks per packet or larger block of information which provides a 326 symbols per pulse rate, 32 synchronization symbols per pulse, and a 25.72 percent transmit duty cycle. As represented by waveform diagram 500, each of pulses 510 are randomly or pseudo-randomly distributed over the five frequencies and over the 591 microsecond time period. By providing such distribution, lost packets and collisions are minimized. It should be noted that the values provided above are in accordance with a preferred embodiment, but should not be construed as limiting the scope of the concepts disclosed.

In an exemplary embodiment, error correction coding may be applied to each sub transmission, so that not all of the smaller bursts need be received correctly in order to correctly receive the information contained in the overall transmission. For example, in an exemplary embodiment, a 99 percent first time success for the overall transmission may be achieved with a channel loading of 13.5 percent, which is a radical improvement over the conventional 1 percent or ½ percent channel loading to which the system may be restricted in a slotted or unspotted Aloha system, respectively. Moreover, when compared with conventional Aloha systems, the peak power and peak bandwidth required by the system are reduced.

Further still, the system using the sub transmission protocol (waveform) described can handle correlated events. For example, if several users, responding to the same event, transmit at the same time, there may still be sufficient randomization occurring as the overall transmission is broken up into the multiplicity of sub transmissions, that enough of the sub transmissions will get through to permit reconstruction of the overall transmission from several users at the same time.

An error correcting code may be used which has especially good "erasure" properties. In coding theory an erasure is an area of the received transmission which is known from knowledge not derived from the receiver itself to be corrupted. Thus, the "erased" portion of the received transmission can receive zero weight as the received transmission is reconstructed by the error correcting decoder. A portion of a message known to be erased is much less damaging than a portion of a message with random errors.

Now a property of radio transmitters is that they block out nearby receivers on the same frequency, or even nearby frequencies because of unavoidable spurious emissions. Accordingly, the sub transmission system described takes advantage of the erasure property of the code to permit the receiving user to make an overall transmission of its own using, for example 16 sub transmissions. There are sufficient gaps in the sub transmissions that simultaneous or near simultaneous reception of several similar transmissions may occur.

In an exemplary embodiment, there may be sufficient synchronization information provided in the overall transmission of the sub transmissions that the receiver may predict when each sub-transmission from each of several other transmitting users will be received. Importantly, those sub-transmissions arriving at the receiving user when the receiving user is simultaneously transmitting may be marked as erased during the time of the receiving user's sub transmissions.

In another exemplary embodiment, there may be additional improvements made on the erasure feature above. For example, there may be sufficient synchronization at the modulation level that the portion of a sub transmission which is not erased may still be used. This further enhances the utility of identifying known erasures. The entire sub burst need not be lost due to loss of synchronization due to the erasure. Rather only the portion actually erased by the competing transmission is lost, and lost to erasure by the transmitting transmitter, which is the most benign type of loss.

Accordingly, by incorporating the sub transmission waveform described with various combinations of features, the systems described may improve on the power and bandwidth efficiency of classical Aloha systems, and may accommodate simultaneous and/or near simultaneous transmission and multiple receptions. Such properties make the system especially useful in a situation in which several users are responding to the same event, and in which the response time requirement is so short that there is not time to do carrier sensing, and there is not time to randomize the exact starting time of transmission.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of operation. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A radio system node, comprising:
   a transceiver, configured to transmit and receive information over more than one frequency;
   a processor, configured to gather a block of information, wherein the block of information, if transmitted at a set rate, would be transmitted over a discrete time period and the processor further configured to format the block of information into a plurality of sub blocks, each sub block comprising message synchronization information,
   wherein the sub blocks are dispersed in time pseudo-randomly over the discrete time period and wherein the sub blocks are dispersed over the more than one frequency and the transceiver is configured to substantially simultaneously transmit and receive multiple transmissions and receptions in the same frequency band.

2. The radio system node of claim 1, wherein the disbursement in time and frequency is chosen by a pseudo random process.

3. The radio system node of claim 1, wherein the processor is configured to provide sufficient gaps between the sub blocks in frequency, in time, or in frequency and time so that the simultaneous transmission and reception of the multiple transmissions in the same frequency band occur.

4. The radio system node of claim 3, wherein the synchronization information is used to predict the arrival of other sub blocks of information.

5. The radio system node of claim 3, wherein the synchronization information comprises phase reference information.

6. The radio system node of claim 1, wherein the more than one frequency comprises at least sixteen (16) frequency channels.

7. The radio system node of claim 1, wherein the sub blocks include error encoding.

8. A radio system node, comprising:
   a transceiver, configured to transmit and receive information over more than one frequency;
   a processor, configured to gather a block of information wherein the block of information, if transmitted at a set rate, would be transmitted over a discrete time period and the processor further configured to format the block of information into a plurality of sub blocks, each sub block comprising message synchronization information,
   wherein the sub blocks are dispersed at pseudo-random points in time over the discrete time period and over the more than one frequency and the transceiver is configured to substantially simultaneously transmit and receive multiple transmissions and receptions in the same frequency band, and wherein a portion of at least one of the sub blocks of information is marked as erased by a receiver when that receiver is simultaneously transmitting.

9. A radio system node, comprising:
   a transceiver configured to generate a waveform, the waveform comprising:
   a plurality of sub blocks of information, the sub blocks of information being derived from a block of information, each sub block of information comprising synchronization information and phase reference information;
   a plurality of frequencies over which the plurality of sub blocks are dispersed;
   a discrete time period over which the block of information, if transmitted at a set rate, would be transmitted and over which the plurality of sub blocks are dispersed in a pseudo-random fashion; and wherein the transceiver is configured to substantially simultaneously transmit and receive multiple transmissions and receptions in the same frequency band.

10. The radio system node of claim 9, wherein the disbursement in time and frequency is chosen by a pseudo random process.

11. The radio system node of claim 9, wherein the synchronization information can be used to predict the arrival of other sub blocks of information.

12. The radio system node of claim 9, wherein the plurality of frequencies comprises at least sixteen (16) frequency channels.

13. The radio system node of claim 9, wherein the sub blocks include error encoding.

14. A method of transmitting a block of information, comprising:

parsing the block of information into a plurality of sub blocks of information; incorporating synchronization information into the sub blocks of information;

setting a discrete time period over which the block of information, if transmitted at set rate, would be transmitted and selecting the time period over which the sub blocks of information will be transmitted to be the discrete time period;

transmitting the sub blocks of information, each of the sub blocks of information being dispersed pseudo-randomly across the discrete time period and across a range of frequencies, substantially simultaneously transmitting and receiving multiple transmission in the same frequency band.

15. The method of claim 14, wherein the disbursement in time and frequency is chosen by a pseudo random process for each sub block.

16. The method of claim 14, wherein the synchronization information can be used to predict the arrival of other sub blocks of information.

17. The method of claim 14, wherein the synchronization information comprises phase reference information.

18. The method of claim 14, wherein the more range of frequencies comprises at least sixteen (16) frequency channels.

19. The method of claim 14, wherein the sub blocks include error encoding.

20. A radio system node comprising:

a transceiver;

a processing means for allowing simultaneous transmission and reception of multiple transmissions in the same frequency band, wherein at least a portion of received information is marked as erased by a receiver when that receiver is simultaneously transmitting, wherein the processing means is configured to transmit a block of information as sub blocks of information, wherein the block of information, if transmitted at a set rate, would be transmitted over a discrete time period, each sub block comprising synchronization information, wherein the sub blocks are dispersed over the discrete time and frequency in a pseudo-random fashion.

21. The radio system of claim 20, wherein the processing means is used to break down a block of information into a plurality of sub blocks of information.

22. The radio system of claim 20, wherein dispersing the sub blocks over frequency includes dispersing the sub blocks over discrete frequencies within the frequency band.

23. The radio system of claim 20, wherein the processing means is configured to provide sufficient gaps between the sub blocks in frequency, in time, or in frequency and time so that the simultaneous transmission and reception of the multiple transmissions in the same frequency band occur.

24. The radio system of claim 20, wherein the processing means incorporates error encoding into each of the sub blocks of information.

* * * * *